(No Model.)

G. HOFFMEIER.
DOOR CHECK.

No. 507,618. Patented Oct. 31, 1893.

Witnesses
Jos. S. Latimer
Carleton E. Snell

Inventor
Gottlieb Hoffmeier
by Arthur E. Brown
his Attorney

UNITED STATES PATENT OFFICE.

GOTTLIEB HOFFMEIER, OF WILMINGTON, DELAWARE.

DOOR-CHECK.

SPECIFICATION forming part of Letters Patent No. 507,618, dated October 31, 1893.

Application filed January 28, 1893. Serial No. 460,051. (No model.)

*To all whom it may concern:*

Be it known that I, GOTTLIEB HOFFMEIER, of Wilmington, in the county of New Castle and State of Delaware, have invented certain new and useful Improvements in Checks and Holders for Doors, Blinds, &c., of which the following is a specification.

The present improved combined check and holder is applicable to doors, blinds and similar movable gates or closures which it is desired should be held in a given position, and which are liable to be moved carelessly and with undue force to said position.

The present improvements are particularly adapted for use with the doors of railway cars, and will be so described.

The improved check and holder consists of two members, a spring dog member and a catch and bumper member, one of which is carried by the door, and the other by any convenient fixed support such as the wall. The spring dog member is preferably secured to the wall and the catch member to the door, but this arrangement may be reversed. The spring-dog member comprises a pivoted dog and a spring co-operating therewith, and the catch member comprises a catch which engages with the dog and a bumper which strikes said spring when the two members come together and thereby increases the tension of the spring upon the dog thus insuring the engagement of the dog and catch, and at the same time the spring acts as a cushion to relieve the members from shock in coming together.

The improvements are illustrated in the accompanying drawings, wherein—

Figure 1:
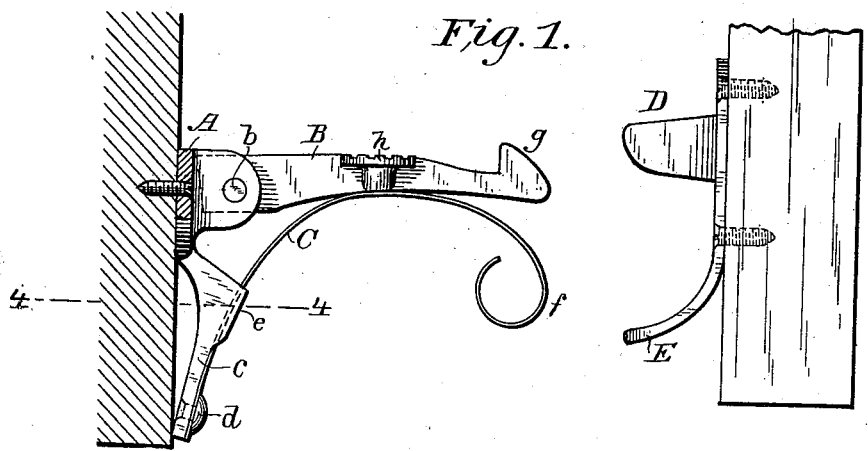
Figure 2:
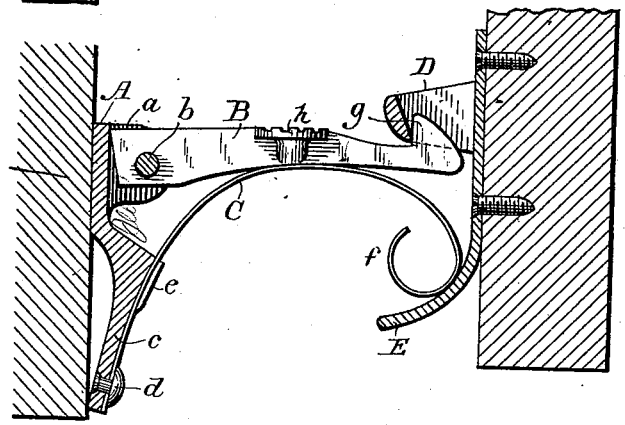
Figure 3:
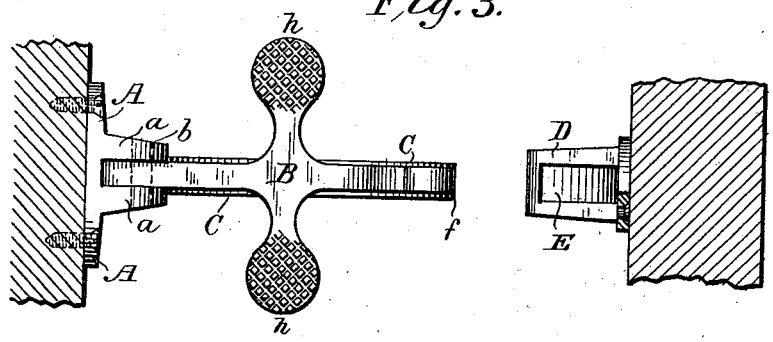
Figure 4:
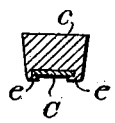

Figure 1 is a side view of the two members when approaching each other. Fig. 2 is a vertical section through the two members when locked together. Fig. 3 is a plan view of both members when occupying the positions shown in Fig. 1. Fig. 4 is a cross section in a plane indicated by the line 4—4 in Fig. 1.

The spring dog member consists principally of a supporting plate A, a dog B, pivoted thereto, and a spring C carried by the supporting plate A, and acting upon the dog to press the same upwardly. The catch member consists of a catch lip, or strike D, and a bumper E.

The supporting plate A is adapted to be screwed to the wall, has ears $a$, $a$, between which the dog B is pivoted by pivot $b$, and has a depending tang $c$, to the lower end of which the lower end of the spring C is attached by a rivet $d$ or otherwise. The front face of the tang $c$ is curved to conform to the curvature of the spring, and it has at its upper part side flanges $e$, $e$, which are turned over the face of the spring C (see Fig. 4) to retain the same in place. The spring C is a flat spring, which bears against the under side of the dog B, and its forward end $f$ extends outwardly beyond or approximately as far as the dog B, and is bowed downwardly, inwardly and upwardly as shown, so as to constitute a spring cushion. The dog has a hooked outer end $g$, and has side wings $h$, $h$, serrated on their upper faces, on either side by means of which (by the foot when placed near the floor) the dog may be depressed against the tension of the spring. The joint between the dog B and plate A is a knuckle joint, so that the extent to which the dog may be depressed and the spring compressed is limited. The catch D, of the catch member is of the usual kind, and is riveted or otherwise connected to a plate, which also constitutes the bumper E, which in turn is screwed or otherwise attached to the door. The bumper extends downwardly from the catch D, and curves outwardly from the door.

When the door is opened and swung back against the wall, the catch D, and hook $g$, of the dog B, encounter each other, and the bumper E, and spring cushion part $f$, of the spring C, encounter each other. The catch D, and hook $g$, engage each other to hold the door open, and the bumper E, and spring cushion $f$, not only check and cushion the door, but also force the spring C positively upward, thereby increasing the tension thereof, and insuring the proper co-action between the dog and catch. To open the door, it is only necessary to depress the dog by pressure applied to one of the side wings $h$. Two of these wings are used so that one will be accessible whichever way the door may be swung.

I claim as my invention—

1. The combination to form a combined check and holder of a pivoted dog and a spring co-operating therewith, with a catch and a bumper which strikes said spring and increases the tension thereof upon the dog, substantially as set forth.

2. The plate A, the dog B, having hook $g$, and wings $h, h$, and pivoted to said plate, the spring C secured to said plate bearing upon the under side of said dog and having a forward cushioning end $f$, in combination with catch D, and bumper E, substantially as set forth.

In witness whereof I have hereunto signed my name in the presence of two subscribing witnesses.

GOTTLIEB HOFFMEIER.

Witnesses:
 HENRY C. CONRAD,
 JOSEPH L. CAVENDER.